3,738,856
X-RAY CONVERSION SCREEN UTILIZING
YTTRIUM OXYSULFIDE PHOSPHOR
Frank Masi, Morristown, N.J., assignor to United States
Radium Corporation, Morristown, N.J.
No Drawing. Filed Jan. 11, 1972, Ser. No. 216,966
Int. Cl. C09k 1/36; H01j 1/63
U.S. Cl. 117—33.5 C
11 Claims

ABSTRACT OF THE DISCLOSURE

An X-ray conversion screen comprises a substrate sheet having on a surface thereof a phosphor coating consisting essentially of at least 5% by weight of yttrium oxysulfide activated wtih from 0.1% to 10% by weight of terbium or a mixture of terbium plus dysprosium. Up to 95% by weight of the phosphor coating may be (a) gadolinium, lanthanum or lutetium oxysulfide phosphor activated with terbium or a mixture of terbium plus dysprosium, (b) barium phosphate activated with divalent europium, (c) calcium tungstate, (d) zinc sulfide or zinc cadmium sulfide activated with copper or silver, or (e) barium lead sulfate.

FIELD OF THE INVENTION

This invention relates to X-ray conversion screens, and more particularly to the use of an yttrium oxysulfide phosphor as the X-ray luminescent coating thereon. The phosphor coating on X-ray conversion screens according to the invention contains at least 5% by weight of the yttrium oxysulfide phosphor, and may consist 100% of this material. Advantageously, however, some amount up to 95% by weight of one or more additional X-ray luminescent phosphors may be used in conjunction with the yttrium oxysulfide to form the coating on the X-ray conversion screen. Such additional phosphor may serve to lessen the cost of the screen, or it may serve to modify advantageously the X-ray luminescent quality of the screen for particular purposes.

DESCRIPTION OF THE PRIOR ART

Luminescent properties of certain rare earth-containing compositions have long been recognized. In recent years, rare earth phosphors have received considerable attention and have been the subject of many intensive investigations. The recent interest is due largely to the discovery that certain rare earth phosphors, particularly the oxygen bearing phosphors (oxyphosphors), can be used advantageously as luminescent coatings for cathode ray tubes and for X-ray conversion screens. The term "X-ray conversion screen" refers to phosphor-coated substrates which become luminescent when excited by X-rays, and includes fluoroscopic screens, X-ray image intensifier screens, and intensifying screens for X-ray photography. This invention is particularly concerned with the latter, which have numerous industrial and medical applications.

In use, X-ray intensifying screens are typically placed in a cassette against a sheet of photographic film for intensifying the exposure of the film by the X-rays. The X-ray radiation is adsorbed by the phosphor exciting it with emission of visible light to which the film is sensitive to form an image on the film.

It is in general desirable to use X-ray intensifying screens which will produce a sharp, bright image in the shortest possible X-ray exposure time. This is especially true in the medical field where the use of bright, fast phosphors reduces the health hazard from prolonged X-ray radiation exposure.

As used herein, "brightness" of a phosphor refers to the degree of darkening that the phosphor when excited produces in a given period of time on a photographic film in contact with it. The terms "speed" and "fast" as used herein are relative terms and means speed or fastness relative to that of a standard calcium tungstate phosphor. Speed is measured by comparing the degree of darkening of a photographic film in contact with a standard calcium tungstate intensifying screen, with the degree of darkening of such film in contact with an intensifying screen coated with the phosphor being measured, and when both such phosphor and the calcium tungstate are excited simultaneously with X-rays of given quality. Unless otherwise specified below, brightness and speed are measured using standard blue-sensitive X-ray film.

Substantially since the beginning of X-ray photography, calcium tungstate phosphors have been widely used as phosphor coatings on X-ray intensifying screens. Recently the use of gadolinium oxysulfide as a phosphor on X-ray conversion screens has been proposed. However, an X-ray intensifying screen coated with gadolinium oxysulfide phosphor is not substantially brighter or faster than the standard calcium tungstate screen when used in conjunction with a standard blue-sensitive X-ray photographic film.

The prior art has reported numerous other types of phosphors useful in X-ray intensifying screens, and numerous improved structures for these screens. Examples of these known phosphors and X-ray intensifying screens are to be found in U.S. Pats. Nos. 1,954,691; 2,144,040; 2,439,181; 2,487,097; 2,523,132; 2,525,832; 2,666,864; 2,694,153; 2,729,060; 2,743,195; 2,884,541; 3,328,311; 3,389,255; 3,457,179 and 3,527,710.

SUMMARY OF THE INVENTION

We have found that X-ray conversion screens having as the X-ray luminescent coating thereon a phosphor composition consisting at least in part of yttrium oxysulfide activated with terbium or with a mixture of terbium plus up to 5% dysprosium by weight of the terbium are notably faster than X-ray conversion screens coated with any other known phosphor composition, including the other rare earth oxysulfide phosphors. For example, an intensifying screen having a terbium-activated yttrium oxysulfide phosphor coating is approximately twice as fast as a conventional calcium tungstate intensifying screen when irradiated with 40–150 KVP X-rays having an aluminum half-value layer of 4 to 5 mm. In contrast, a similar screen coated with a terbium-activated gadolinium oxysulfide phosphor, irradiated with X-rays of like quality has a speed only about the same as the conventional calcium tungstate screen. This high speed of terbium-activated yttrium oxysulfide phosphors is most surprising in view of the fact that other rare earth oxysulfide phosphors which are known to have superior X-ray stopping power all have very much lower speeds.

X-ray quality is commonly measured in terms of the voltage applied to the X-ray tube. For example, X-ray for medical usage commonly are produced at tube potential in the range from 40 to 150 kilovolts (customarily abbreviated KVP). At any given tube potential, the X-rays generated are produced over a range of wave lengths. The penetrating quality of such X-rays customarily is measured by determining the thickness of an absorber, for example aluminum, required to attenuate the radiation to one-half its initial intensity; and such thickness is termed the "half value layer" for the particular absorber used. Thus, in the foregoing reference to "40 to 150 KVP X-rays having an aluminum half-value layer of 4 to 5 millimeters" identifies the X-rays as having been generated at a tube potential in the range from 40 to 150 kilovolts and being capable of penetrating 4 to 5 millimeters of aluminum before becoming attenuated to one-half their initial intensity. Initial and attenuated intensities are measured by means of an ionization gage.

The present invention provides an X-ray conversion screen comprising a substrate sheet having coated on a surface thereof an X-ray luminescent phosphor consisting essentially of at least 5% by weight of particles of yttrium oxysulfide containing from 0.1% to 10% by weight of said particles of a rare earth activator selected from a group consisting of (i) terbium and (ii) terbium plus dysprosium in an amount up to 5% by weight of the terbium. The balance (if any), up to 95% by weight of the X-ray luminescent phosphor coating, consists of at least one additional phosphor composition selected from the group consisting of (a) oxysulfide phosphorus of a rare earth selected from the group consisting of gadolinium, lanthanum and lutetium activated with a rare earth selected from the group consisting of (i) terbium , (ii) terbium plus dysprosium in an amount up to 5% by weight of the terbium, (b) barium phosphate activated with divalent europium, (c) calcium tungstate, (d) zinc sulfide phosphors selected from the group consisting of zinc sulfide and zinc-cadmium sulfide activated with a metal selected from the group consisting of copper and silver, and (e) barium lead sulfate.

The additional phosphor is advantageously used in conjunction with the yttrium oxysulfide phosphor to lessen the cost of the phosphor coating without objectionably reducing the speed of the screen, or to modify the X-ray luminescent quality of the phosphor coating of certain purposes, or for a combination of these reasons; and for such purposes the phosphor coating on the conversion screen generally contains at least 25% by weight of one or more of the aforesaid additional phosphors. Large amounts of relatively slow but less costly phosphors may be used, because the speed of the yttrium oxysulfide may be reduced by a third or more and yet remain significantly faster than any commercial medical screen currently available.

Although gadolinium oxysulfide is not notably less expensive than yttrium oxysulfide, the use of these two rare earth compounds together in an X-ray screen according to the invention is particularly advantageous because the speed of the combination over a very wide range of X-radiation quality values is approximately level. Hence the invention particularly contemplates X-ray conversion screens wherein the X-ray luminescent phosphor consists essentially of 7% to 30% by weight of the yttrium oxysulfide particles and the balance gadolinium oxysulfide. For cost reduction purposes, the yttrium gadolinium phosphor may be used in conjunction with one or more of the other additional phosphor compositions mentioned above.

DESCRIPTION OF THE INVENTION

An X-ray conversion screen according to the invention is prepared by coating the X-ray luminescent phosphor on the surface of the substrate sheet. The substrate sheet, and the procedure by which the phosphor is coated thereon, are conventional. The substrate sheet, for example, may be glass, or it may be a cellulosic product such as high density smooth-calendered cardboard, or it may be a synthetic plastic composition such as a polyester. The X-ray luminescent phosphor may advantageously be incorporated in a coating composition having a resin binder, as is customary in making X-ray conversion screens, and may be coated on the substrate sheet by spreading it thereon, to a predetermined thickness, so as to apply to the sheet surface a coating containing the desired weight of phosphor per unit of surface of the substrate sheet.

The X-ray luminescent phosphor according to the invention consists essentially of at least 5% by weight of terbium-activated yttrium oxysulfide. Rare earth activated oxysulfide phosphors, including yttrium oxysulfide, are known and are described, for example, as cathode luminescent phosphors in Royce U.S. Pat. 3,418,246. However, the exceptional speed of yttrium oxysulfide as an X-ray conversion screen phosphor has not previously been known. Yttrium oxysulfide $Y_2O_2S$, in which from 0.1% to 10% by weight of the yttrium has been replaced by terbium alone or together with dysprosium in an amount up to 5% by weight of the terbium forms a very satisfactory terbium-activated yttrium oxysulfide phosphor for use on X-ray conversion screens in accordance with the invention. The invention is not limited to any particular physical form of the activated yttrium oxysulfide phosphor, or to any particular method for preparing it. However, rare earth oxysulfides containing from 20 to 500 parts per million (0.0002% to 0.05% by weight) of fluorine in the lattice structure have been found to be especially satisfactory in the preparation of phosphors, and the term "oxysulfide" as used herein includes yttrium oxysulfide and other rare earth oxysulfides containing very small amounts of fluorine.

X-ray conversion screens according to the invention may with advantage have an X-ray luminescent phosphor coating consisting solely of yttrium oxysulfide activated with terbium or with terbium plus dysprosium. Such a screen has maximum speed over the major portion of the range of radiation quality of interest for medical X-ray photographic purposes, although its speed advantage over some other phosphors (especially terbium activated gadolinium oxysulfide), is reduced at high aluminum half-value layers (e.g. 8 mm.). In many cases, however, it is desirable to utilize an additional phosphor composition in conjunction with the yttrium oxysulfide to form the X-ray luminescent phosphor coated on the conversion screen substrate. The additional phosphor compositions that have been found to be useful in conjunction with yttium oxysulfide are the following:

(a) Rare earth oxysulfide phosphors, especially those of gadolinium, lanthanum and lutetium, activated with either terbium alone or a mixture of terbium plus up to 5% dysprosium by weight of the terbium;
(b) barium phosphate activated with divalent europium;
(c) calcium tungstate;
(d) zinc sulfide or zinc-cadmium sulfide activated with copper or silver; and
(e) barium-lead sulfate.

These additional phosphor compositions are all known to have X-ray luminescent properties, and many of them have been used heretofore as the phosphor component in the coating on an X-ray conversion screen. The use of one or more of them in conjunction with yttrium oxysulfide in conversion screens phosphors according to this invention may serve various purposes. For example, lanthanum oxysulfide, barium phosphate, calcium tungstate, the zinc sulfide phosphors, and barium-lead sulfate are all much less expensive than yttrium oxysulfide. Hence by diluting the yttrium oxysulfide phosphor with a substantial proportion of one of these phosphors, the cost of X-ray screens in accordance with the invention may be greatly reduced without unacceptable loss of speed. Such reduction in cost is of course accompanied by some reduction in speed, but even a substantial speed reduction, by one third or more, still results in a screen which is faster than any heretofore available commercial intensifying screen, especially when exposed to X-ray radiation near the middle of the quality range conventionally used for medical X-ray photographically.

The additional phosphor may also serve another purpose than that of cost reduction. For example, the use of gadolinium oxysulfide activated with terbium or with terbium plus dysprosium, in conjunction with yttrium oxysulfide, results in a X-ray luminescent phosphor composition having a speed which is substantially uniform over a wide range of X-ray quality. For example, a mixture of 75% by weight terbium-activated yttrium oxysulfide particles and 25% by weight terbium-activated gadolinium oxysulfide particles forms a phosphor having a speed 75% greater than calcium tungstate screens over substantially the entire range of X-radiation quality (from 1 to 8 millimeters of aluminum half value) of interest in medical X-ray photography. In general, the proportion of yttrium oxysulfide to gadolinium oxysulfide in such mixtures may range from 7% to 50%.

Calcium tungstate is a particularly advantageous additional phosphor composition to use in conjunction with yttrium oxysulfide. For example, a mixture of 75% terbium-activated yttrium oxysulfide plus 25% calcium tungstate forms an X-ray luminescent phosphor composition having a speed 50% greater than a 100% calcium tungstate screen, and a fairly flat speed curve over the full range of X-radiation quality utilized in medical X-ray photography. In general, it is desirable to employ at least 25% by weight of the additional phosphor in conjunction with yttrium oxysulfide, for by so doing a worthwhile cost reduction may be attained in the production of conversion screens according to the invention without excessive loss to speed. Indeed, as previously indicated, even the use of as much as 95% by weight of the additional phosphor, with only 5% by weight of yttrium oxysulfide, yields an X-ray conversion screen having improved speed as compared with conversion screens utilizing the heretofore known X-ray luminescent phosphors without yttrium oxysulfide.

The additional phosphor composition advantageously is used in conjunction with the yttrium oxysulfide phosphor by simply blending together particles of the two phosphors to form a mixture in which they are present in the desired proportions (at least 5% by weight yttrium oxysulfide). The resulting mixture may then be coated on the substrate sheet in a conventional manner.

It is not necessary, however, for the yttrium oxysulfide phosphor to be physically mixed with the additional phosphor composition. Instead, the substrate sheet may be coated with a first layer of one of these phosphors, and then a second layer of the other phosphor may be coated thereover.

X-ray intensifying screens are conventionally used in pairs, one forming a front screen and another forming a back screen in contact with opposite surfaces of a photographic film to be exposed. It is possible, and it is contemplated by the invention, to coat one of these screens with an yttrium oxysulfide phosphor, and to coat the other screen with the additional phosphor composition free of yttrium oxysulfide. In this fashion, the use of the additional phosphor composition in conjunction with yttrium oxysulfide is achieved by coating the different compositions on different, but paired, screens. In such a combination, the yttrium oxysulfide may be mixed with additional phosphor compositions to form the coating for one of the two screens, and a coating free of yttrium oxysulfide may be applied to the other screen of the pair.

Yttrium oxysulfide activated with 2% or more of terbium or terbium plus dysprosium, when excited by X-rays, emits visible light which appears green to the eye. However, at low concentrations of such activator the light emission includes a large proportion of blue and when the activator concentration is below about 1% the light emission is distinctly bluish to the eye. Hence X-ray intensifying screens coated with a phosphor comprising yttrium oxysulfide activated with less than 2%, and more particularly with less than 1%, of terbium or terbium plus dysprosium is fully compatible with present-day blue sensitive X-ray photographic film. Concentrations of the activator may advantageously be above 2% if the film is green-sensitive.

The amount of X-ray luminescent phosphor coated on the substrate to form a conversion screen according to the invention may vary over a wide range. For example, from 20 to 200 milligrams per square centimeter of the X-ray luminescent phosphor may be coated on the substrate. The deposition density depends in part at least on the purpose for which the screen is to be used, and on its desired operating characteristics. Thus, screens having a phosphor deposition density at the low end of the above range, say from 20 to 35 milligrams per square centimeter, are desirable for high resolution X-ray photography, but may require relatively long exposure to the X-radiation for the production of good quality photographs. Thick screens, having a deposition density in the range from 150 to 200 milligrams per square centimeter, are advantageous for minimizing time of exposure to the X-radiation, but the resolution obtainable with such screens is not equal to that obtainable with thin screens. In general, the deposition density of the yttrium oxysulfide phosphor on X-ray conversion screens according to the invention is conventional, and is determined in accordance with the convention practice for the intended purpose and characteristics of the screen.

EXAMPLE 1

Finely divided yttrium oxysulfide phosphor, terbium activated, was prepared by co-precipitating yttrium and terbium as oxalates from a chloride solution. The precipitate, after filtering and washing, was mixed with sulfur and a flux comprising sodium carbonate and potassium phosphate, and then was fired at 2100° F. for several hours. The resulting finely divided yttrium oxysulfide phosphor incorporating about 0.3% terbium was mixed with a standard resin binder and coated on a cardboard substrate sheet at a density of 39 mg. of the phosphor per sq. cm. to form an X-ray intensifying screen. This screen, on which terbium activated yttrium oxysulfide was the sole luminescent phosphor, was found to have a speed substantially twice that of a standard "super speed" (STF-2) calcium tungstate screen when irradiated with 40-150 KVP X-rays having an aluminum half value layer of 1.5 mm. At an aluminum half value layer of 4.0 this screen was about 1.85 times as fast as the calcium tungstate screen, and at an aluminum half value layer of 6.0 it was about 1.7 times as fast as the calcium tungstate screen. In comparison with a screen coated more thickly with a phosphor composed solely of terbium activated gadolinium oxysulfide (coating density 67 mg. per sq. cm.), the yttrium oxysulfide screen was about 1.7 times as fast when irradiated with 40-150 KVP X-rays at aluminum half value layers of 1.5 mm., 4.0 mm., and 6.0 mm., despite its substantially lesser coating density. Speed determination in all instances in this and the following examples was made using a standard blue-sensitive X-ray photographic film in a cassette having front and back screens.

EXAMPLE 2

An X-ray intensifying screen was prepared as described in Example 1, but using as the phosphor a mixture of 75% by weight terbium activated yttrium oxysulfide and 25% by weight terbium activated gadolinium oxysulfide, coated on the substrate at a density of 37 mg. per sq. cm. The resulting screen when irradiated with 40-150 KVP X-rays was found to have a virtually flat speed curve at all aluminum half-value layers from 1.5 mm. to 7.5 mm., substantially the entire medical range, and was about 1.8 times as fast as a standard "super speed" (STF-2) calcium tungstate screen over this entire range. When the proportion of yttrium oxysulfide in the phosphor coating was reduced to 7% by weight (93% by weight gadolinium oxysulfide) the screen at a coating density of 77 mg. per sq. cm., had a speed curve which was no longer flat but was faster by at least 10% than a "super speed" (STF-2) calcium tungstate screen at all aluminum half value layers from 1.5 to 7.5 mm.

EXAMPLE 3

An X-ray intensifying screen was prepared as described in Example 1, but using as the phosphor a mixture of 75% by weight terbium activated yttrium oxysulfide and 25% by weight calcium tungstate, coated on the substrate at a density of 31 mg. per sq. cm. Upon irradiation with 40-150 KVP X-rays the resulting screen was found to be 1.7 times as fast as a "super speed" (STF-2) calcium tungstate screen at 1.5 mm. aluminum half value layer, 1.5 times as fast at 4.0 mm., and 1.6 times as fast at 7.5 mm.

EXAMPLE 4

In all the foregoing examples, speed determination was made using similarly coated front and back screens in a cassette. In this example, the front screen was coated with 22 mg. per sq. cm. of terbium activated yttrium oxysulfide phosphor and the back screen was coated with 38 mg. per sq. cm. of terbium activated gadolinium oxysulfide phosphor. The combination when irradiated with 40–150 KVP X-rays was found to be about 45% faster than the "super speed" (STF-2) calcium tungstate screen at 1.5 mm. aluminum half value layers, about 30% faster at 4.0 mm., about 23% faster at 6.0 mm., and about 15% faster at 7.5 mm.

I claim:

1. An X-ray conversion screen comprising a substrate sheet having coated on a surface thereof an X-ray luminescent phosphor consisting essentially of at least 5% by weight of particles of yttrium oxysulfide containing from 0.1% to 10% by weight of said particles of a rare earth activator selected from the group consisting of (i) terbium and (ii) terbium plus dysprosium in amount up to 5% by weight of the terbium, and up to 95% by weight of at least one additional phosphor composition selected from the group consisting of (a) oxysulfide phosphors of a rare earth selected from the group consisting of (i) linium, lanthanum and lutetium activated with a rare earth selected from the group consisting of (i) terbium and (ii) terbium plus dysprosium in amount up to 5% by weight of the terbium, (b) barium phosphate activated with divalent europium, (c) calcium tungstate, (d) zinc sulfide phosphors selected from the group consisting of zinc sulfide and zinc-cadmium sulfide activated with a metal selected from the group consisting of copper and silver, and (e) barium lead sulfate.

2. An X-ray conversion screen according to claim 1 wherein the deposition density of the X-ray luminescent phosphor on the substrate sheet is in the range from 20 to 200 mg./sq. cm.

3. An X-ray conversion screen according to claim 1 wherein the X-ray luminescent phosphor consists essentially of 7% to 50% by weight of the yttrium oxysulfide particles, and the balance gadolinium oxysulfide phosphor activated with a rare earth selected from the group consisting of (i) terbium and (ii) terbium plus dysprosium in amount up to 5% by weight of the terbium.

4. An X-ray conversion screen according to claim 1 wherein at least 25% by weight of the X-ray luminescent phosphor is lanthanum oxysulfide phosphor activated with a rare earth selected from the group consisting of (i) terbium and (ii) terbium plus dysprosium.

5. An X-ray conversion screen according to claim 1 wherein at least 25% by weight of the X-ray luminescent phosphor is calcium tungstate.

6. An X-ray conversion screen according to claim 1 wherein at least 25% by weight of the X-ray luminescent phosphor is barium phosphate activated with divalent europium.

7. An X-ray conversion screen according to claim 1 wherein at least 25% by weight of the X-ray luminescent phosphor is a zinc sulfide phosphor selected from the group consisting of zinc sulfide and zinc-cadmium sulfide activated with a metal selected from the group consisting of copper and silver.

8. An X-ray conversion screen according to claim 1 wherein at least 25% by weight of the X-ray luminescent phosphor is barium-lead sulfate.

9. An X-ray intensifying screen according to claim 1 which luminesces with predominantly blue light, wherein the yttrium oxysulfide contains from 0.1% to 2% by weight of the rare earth activator.

10. An X-ray intensifying screen according to claim 9, wherein the yttrium oxysulfide contains from 0.1% to 1% by weight of the rare earth activator.

11. An X-ray intensifying screen according to claim 1, which luminesces with predominantly green light, wherein the yttrium oxysulfide contains from 2% to 10% by weight of the rare earth activator.

References Cited

UNITED STATES PATENTS

| | | | |
|---|---|---|---|
| 2,694,153 | 1/1954 | Longini | 313—65 |
| 2,743,195 | 4/1956 | Longini | 117—33.5 C |
| 3,360,673 | 12/1967 | Vanderpool et al. | 252—301.4 P |
| 3,389,255 | 6/1968 | Takizowa et al. | 250—80 |
| 3,509,065 | 4/1970 | Palilla | 252—301.4 P |
| 3,525,698 | 8/1970 | Leto et al. | 252—301.4 P |
| 3,527,710 | 9/1970 | Toma et al. | 252—301.4 P |

RALPH HUSACK, Primary Examiner

W. R. TRENOR, Assistant Examiner

U.S. Cl. X.R.

117—211; 250—80; 252—301.4 P

UNITED STATES PATENT OFFICE
CERTIFICATE OF CORRECTION

Patent No. 3,738,856    Dated  June 12, 1973

Inventor(s) Frank Masi, et al.

It is certified that error appears in the above-identified patent and that said Letters Patent are hereby corrected as shown below:

Column 1, in the masthead, after "Frank Masi" insert --and Melvin Tecotzky--

Signed and sealed this 23rd day of April 1974.

(SEAL)
Attest:

EDWARD M. FLETCHER, JR.
Attesting Officer

C. MARSHALL DANN
Commissioner of Patents